United States Patent [19]
Hahn et al.

[11] Patent Number: 6,030,680
[45] Date of Patent: Feb. 29, 2000

[54] ADHESION OF AMORPHOUS SATURATED HYDROCARBON THERMOPLASTIC SUBSTRATES

[75] Inventors: Stephen F. Hahn, Sandord, Mich.; Mark D. Newsham, Lakeville, Mass.; William G. Lutz, Linwood; Leonardo C. Lopez, Midland, both of Mich.

[73] Assignee: The Dow Chemical Company, Midland, Mich.

[21] Appl. No.: 09/148,087

[22] Filed: Sep. 4, 1998

Related U.S. Application Data

[60] Provisional application No. 60/060,300, Sep. 29, 1997.

[51] Int. Cl.$^7$ ........................................... B32B 3/00
[52] U.S. Cl. ..................... 428/64.1; 428/64.4; 428/500; 428/913; 430/270.11; 430/495.1; 430/945; 369/283
[58] Field of Search ................... 428/64.1, 64.2, 428/64.4, 411.1, 500, 913; 430/270.11, 495.1, 945; 369/283

[56] References Cited

U.S. PATENT DOCUMENTS

| | | |
|---|---|---|
| 3,030,346 | 4/1962 | Cooper, Jr. . |
| 3,231,635 | 1/1966 | Holden . |
| 3,390,207 | 6/1968 | Moss . |
| 3,652,516 | 3/1972 | Farrar . |
| 3,734,973 | 5/1973 | Farrar . |
| 4,096,203 | 6/1978 | St. Clair . |
| 4,200,718 | 4/1980 | Tung . |
| 4,205,016 | 5/1980 | Tung . |
| 4,210,729 | 7/1980 | Hermans . |
| 4,845,173 | 7/1989 | Yoshida . |
| 5,073,427 | 12/1991 | Suga . |
| 5,115,041 | 5/1992 | Tenney . |
| 5,142,007 | 8/1992 | Sagane . |
| 5,143,979 | 9/1992 | Nishi . |
| 5,300,558 | 4/1994 | Kurisu et al. ............................ 524/707 |
| 5,700,878 | 12/1997 | Hucul . |

FOREIGN PATENT DOCUMENTS

| | | |
|---|---|---|
| 124140 | 11/1984 | European Pat. Off. . |
| 410468 | 1/1991 | European Pat. Off. . |
| 410879 | 1/1991 | European Pat. Off. . |
| 770995 | 5/1997 | European Pat. Off. . |
| 359832 | 3/1991 | Japan . |
| 359833 | 3/1991 | Japan . |
| 4335009 | 11/1992 | Japan . |

OTHER PUBLICATIONS

Chemical Abstracts, vol. 118, No. 14, Apr. 5, 1993, abstract No. 126201, Tsunashima, K., E.A.: "Amorphous polyolefin films", & JP 04 283245 A (Toray Industries Inc.).

Chemical Abstracts, vol. 90, No. 8, Feb. 19, 1979, abstract No. 55913, Kuwashima, T., & JP 53 115781 A (Mitsubshi Monsanto Chemical Co.).

Database WPI, Derwent Publications Ltd., London, GB, AN 92–420071 & JP 04 315832 A (Mitsubishi Kasei Corp.), Nov. 6, 1992.

Matthew Tirrell, "Measurement of Interfacial Energy at Solid Polymer", Langmuir 1996, 12, 4548–4551.

G. S. Nadiger, "Effect of Plasma Treatment on the Structure and Allied Textile Properties of Mulberry Silk", J of Applied Poly Sci., vol. 30, 4127–4136 (1985).

R. Foerch, Remote Nitrogen Plasma Treatment of Polymers: Polyethylene, Nylon 6,6, Poly(ethylene Vinyl Alcohol), and Poly(ethylene Terephthalate), J. of Poly Sci. Part A: Polymer Chemistry, vol. 39, 279–286 (1992).

L. J. Gerenser, "E.s.c.a. studies of corona–discharge–treated polyethylene surfaces by use of gas–phase derivaization", Polymer, 1985, vol. 26, Aug.

D. T. Clark, "ESCA Applied to Polymers. XXIII. RF Glow Discharge Modification of Polymers in Pure Oxygen and Helium–Oxygen Mixtures", J. of Poly. Sci.: Polymer Chemistry Edition, vol. 17, 957–976 (1979).

Alphonsus V. Pocius, "Adhesion and Adhesives Technology", 1997 pp. 147–182, Hanser Publishers.

G. Kill, "Reactions of Polyethylene Surfaces with the Downstream Products of an Air Plasma: Gas Phase and Surface Spectroscopic Studies", J. of Poly. Sci.: Part A: Polymer Chemistry, vol. 34, 2299–2310 (1996).

*Primary Examiner*—Elizabeth Evans

[57] ABSTRACT

The present invention is a amorphous saturated hydrocarbon thermoplastic substrate having enhanced adhesion properties, wherein the enhanced adhesion properties are obtained by treating the surface of the amorphous saturated hydrocarbon thermoplastic substrate with an excited gas phase technique, such that a critical surface energy of at least 35 dyne/cm is obtained without the use of acids or other corrosive materials which cause equipment degradation.

22 Claims, No Drawings

ADHESION OF AMORPHOUS SATURATED HYDROCARBON THERMOPLASTIC SUBSTRATES

CROSS REFERENCE STATEMENT

This applications claims the benefit of U.S. Provisional Application Ser. No. 60/060,300, filed Sep. 29, 1997.

BACKGROUND OF THE INVENTION

The present invention relates to amorphous saturated hydrocarbon thermoplastic substrates having improved adhesion properties.

Amorphous saturated hydrocarbon thermoplastics, such as polyvinylcyclohexane, have found uses in a variety of applications including multilayered or laminated articles such as optical disc media. Such multilayered or laminated articles typically comprise a layer of hydrogenated aromatic polymer and an additional layer of a metal or a polymeric material. However, previous attempts at applying metals or polymers to such hydrogenated aromatic polymer surfaces have resulted in poor adhesion.

JP-4-335009 by Tanaka et al. discloses a hydrogenated hydroxyl-substituted styrene copolymer with increased adhesion to recording film layers. However, such copolymers are not commercially available and are typically obtained by an expensive multistep process.

JP-3-59833 by Kato et al. discloses a hydrogenated vinyl aromatic polymer optical disc substrate having improved adhesion by treating the substrate with a mixed solution of sulfuric acid and chromic acid, while JP-3-59832 by Kato et al. discloses a similar method using fuming nitric acid. However, these wet corrosive methods are hazardous and can lead to equipment degradation.

U.S. Pat. No. 5,073,427 by Suga et al. discloses an optical disc surface treated with a fluorine-containing gas to improve adhesion to a recording layer formed thereon. However, this method is impractical since fluorine is toxic and corrosive, and hydrofluoric acid is produced as a byproduct.

Therefore, a need remains for amorphous saturated hydrocarbon thermoplastic substrates having enhanced adhesion properties, wherein the enhanced adhesion is obtained by an efficient and effective method without using or producing wet corrosive materials which causes equipment degradation.

SUMMARY OF THE INVENTION

The present invention is an amorphous saturated hydrocarbon thermoplastic substrate having enhanced adhesion properties, wherein the enhanced adhesion properties are obtained by treating the surface of the amorphous saturated hydrocarbon thermoplastic substrate with an excited gas phase technique, such that a critical surface energy of at least 35 dyne/cm is obtained, without the use of acids or other corrosive materials which cause equipment degradation.

Excited gas phase techniques allow for improved adhesion of a metal or polymer to the substrate without the use of corrosive or toxic materials which cause equipment degradation. Such methods are particularly beneficial in enhancing the adhesion of a metal to an optical media disc made of polycyclohexylethylene (PCHE).

DESCRIPTION OF THE PREFERRED EMBODIMENTS

The present invention is a amorphous saturated hydrocarbon thermoplastic substrate having improved adhesion to a metal or polymeric material.

The discs of the present invention are produced from amorphous saturated hydrocarbon thermoplastics. The term saturated refers to the amount of olefinic bonds within the chemical structure. As used herein, saturated refers to a polymer wherein less than 10 percent of the carbon-carbon bonds are olefinic or unsaturated in nature, generally less than 7.5 percent, typically less than 5 percent, advantageously less than 2 percent, more advantageously less than 1.5 percent, preferably less than 1 percent, more preferably less than 0.5 percent and most preferably less than 0.2 percent. These types of polymers include hydrogenated aromatic polymers, cyclic-olefin-copolymers and hydrogenated ring opening metathesis polymers.

Hydrogenated aromatic polymers include any polymeric material containing a pendant aromatic functionality which is subsequently hydrogenated. Pendant aromatic refers to a structure wherein the aromatic group is a substituent on the polymer backbone and not embedded therein. Preferred aromatic groups are $C_{6-20}$ aryl groups, especially phenyl. These polymers may also contain other olefinic groups in addition to the aromatic groups. Preferably, the polymer is derived from a monomer of the formula:

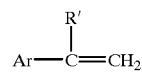

wherein R' is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, cyano, carbonyl and carboxyl. More preferably Ar is phenyl or alkyl phenyl with phenyl being most preferred. Typical vinyl aromatic monomers which can be used include styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. Homopolymers may have any stereostructure including syndiotactic, isotactic or atactic; however, atactic polymers are preferred. In addition, hydrogenated copolymers containing these aromatic monomers including random, pseudo random, block and grafted copolymers may be used in accordance with the present invention. For example, copolymers of vinyl aromatic monomers and comonomers selected from nitriles, acrylates, acids, ethylene, propylene, maleic anhydride, maleimides, vinyl acetate, and vinyl chloride may also be used such as styrene-acrylonitrile, styrene-alpha-methylstyrene and styrene-ethylene. Hydrogenated block copolymers of vinyl aromatic monomers and conjugated dienes such as butadiene, isoprene may also be used. Examples include styrene-butadiene, styrene-isoprene, styrene-butadiene-styrene and styrene-isoprene-styrene copolymers. Further examples of block copolymers may be found in U.S. Pat. Nos. 4,845,173, 4,096,203, 4,200,718, 4,210,729, 4,205,016, 3,652,516, 3,734,973, 3,390,207, 3,231,635, and 3,030,346. Blends of such hydrogenated polymers with other polymers including impact modified, grafted rubber containing aromatic polymers may also be used. Preferably, the hydrogenated aromatic polymer is polyvinylcyclohexane (PVCH) prepared by hydrogenating atactic polystyrene as described in U.S. Pat. No. 5,700,878, herein incorporated by reference.

The weight average molecular weight (Mw) of the aromatic polymers which are hydrogenated is typically from 10,000 to 3,000,000, more preferably from 100,000 to 1,000,000, and most preferably from 100,000 to 500,000.

Cyclic-olefin-copolymers are polymerized cycloolefin monomers such as norbornene-type polymers as described in U.S. Pat. Nos. 5,115,041, 5,142,007, 5,143,979, all of which are incorporated herein by reference. The cycloolefin moiety may be substituted or unsubstituted. Suitable cycloolefin monomers include substituted and unsubstituted norbornenes, dicyclopentadienes, dihydrodicyclopentadienes, trimers of cyclopentadiene, tetracyclododecenes, hexacycloheptadecenes, ethylidenyl norbornenes and vinylnorbornenes. Substituents on the cycloolefin monomers include hydrogen, alkyl alkenyl, and aryl groups of 1 to 20 carbon atoms and saturated and unsaturated cyclic groups of 3 to 12 carbon atoms which can be formed with one or more, preferably two, ring carbon atoms. Generally speaking, the substituents on the cycloolefin monomers can be any which do not poison or deactivate the polymerization catalyst. Examples of preferred monomers include but are not limited to dicyclopentadiene, methyltetracyclododecene, 2-norbornene, and other norbornene monomers such as 5-methyl-2-norbornene, 5,6-dimethyl-2-norbornene, 5-ethyl-2-norbornene, 5-ethylidenyl-2-norbornene, 5-butyl-2-norbornene, 5-hexyl-2-norbornene, 5-octyl-2-norbornene, 5-phenyl-2-norbornene, 5-dodecyl-2-norbornene, 5-isobutyl-2-norbornene, 5-octadecyl-2-norbornene, 5-isopropyl-2-norbornene, 5-p-toluyl-2-norbornene, 5-$\alpha$-naphthyl-2-norbornene, 5-cyclohexyl-2-norbornene, 5-isopropenyl-2-norbornene, 5-vinyl-2-norbornene, 5,5-dimethyl-2-norbornene, tricyclopentadiene (or cyclopentadiene trimer), tetracyclopentadiene (or cyclopentadiene tetramer), dihydrodicyclopentadiene (or cyclopentene-cyclopentadiene co-dimer), methyl-cyclopentadiene dimer, ethyl-cyclopentadiene dimer, tetracyclododecene 9-methyl-tetracyclo[6,2,1,1$^{3,6}$O$^{2,7}$]dodecene-4, (or methyl-tetracyclododecene), 9-ethyl-tetracyclo[6,2,1,1$^{3,6}$O$^{2,7}$] dodecene-4, (or ethyl-tetracyclododecene), 9-hexyl-tetracyclo[6,2,1,1$^{3,6}$O$^{2,7}$]-dodecene-4, 9-decyl-tetracyclo[6,2,1,1$^{3,6}$O$^{2,7}$]dodecene-4, 9-decyl-tetracyclo[6,2,1,1$^{3,6}$O$^{2,7}$] dodecene-4, 9,10-dimethyl-tetracyclo-[6,2,1,1$^{3,6}$O$^{2,7}$] dodecene-4, 9-methyl-10-ethyl-tetracyclo[6,2,1,1$^{3,6}$O$^{2,7}$]-dodecene-4, 9-cyclohexyl-tetracyclo[6,2,1,1$^{3,6}$O$^{2,7}$] dodecene-4, 9-chloro-tetracyclo[6,2,1,1$^{3,6}$O$^{2,7}$]dodecene-4, 9-bromo-tetracyclo[6,2,1,1$^{3,6}$O$^{2,7}$]-dodecene-4, 9-fluoro-tetracyclo[6,2,1,1$^{3,6}$O$^{2,7}$]dodecene-4, 9-isobutyl-tetracyclo [6,2,1,1$^{3,6}$O$^{2,7}$]dodecene-4, and 9,10-dichloro tetracyclo-[6,2,1,1$^{3,6}$O$^{2,7}$]dodecene-4.

Polymers comprising two or more different types of monomeric units are also suitable. For example, copolymers of methyltetracyclododecane (MTD) and methylnorbornene (MNB) are especially suitable. More preferably, the polymers comprise three or more different types of monomeric unites, e.g., terpolymers, including MTD, MNB and dicyclopentadiene (DCPD).

Ring opening metathesis polymers include polymers prepared by metathesis ring opening (co)polymerization of a norbornene or tetracyclododecane, such as those described in J-85/26,024 and U.S. Pat. No. 5,053,471 which is incorporated herein by reference.

The hydrogenated polymers useful in the present invention include any hydrogenated polymer as described above, which has been hydrogenated to a level of at least 80 percent aromatic hydrogenation, generally at least 85 percent, typically at least 90 percent, advantageously at least 95 percent, more advantageously at least 98 percent, preferably at least 98 percent, more preferably at least 99.5 percent, and most preferably at least 99.8 percent. Methods of hydrogenating aromatic polymers are well known in the art such as that described in U.S. Pat. No. 5,700,878 by Hahn and Hucul, wherein aromatic polymers are hydrogenated by contacting the aromatic polymer with a hydrogenating agent in the presence of a silica supported metal hydrogenation catalyst having a narrow pore size distribution and large pores. Methods of hydrogenating cyclic olefin copolymers and ring opening metathesis polymers are well known in the art and disclosed in the patents cited previously.

The hydrogenated aromatic polymers described above can be used in a variety of applications including various molded products such as optical media discs. Methods of molding are well known in the art and include compression and injection molding. Typically, the molding temperature is between 200 and 300° C., and is preferably between 260 and 300° C.

In order to enhance the adhesion of the amorphous saturated hydrocarbon thermoplastic substrate, the surface of the molded substrate is treated using an excited gas-phase technique such that the critical surface energy is at least 35, typically at least 38, generally at least 40, preferably at least 43, more preferably at least 45 and most preferably at least 50 dynes/am to 85, preferably 80, more preferably 75, and most preferably 70 dynes/cm. Critical surface energy is commonly determined by the interfacial relationship between a surface and a liquid (or gas), and is discussed in *Physical Chemistry of Surfaces,* Fifth Ed., by Arthur W. Adamson, Wiley-Interscience, New York, N.Y. 1990 and "Interfacial Properties", by Jeffrey T. Koberstein, *Encyclopedia of Polymer Science and Technology,* 2$^{nd}$ Edition, 1987, Volume 8 pp. 272–275.

Excited gas-phase techniques are well known in the art and include corona discharge, plasma, flame and ozone treatment. These techniques utilize a gaseous flow which is contacted with a high energy source such as high energy electrical discharge, shock waves, microwaves, lasers, radio frequency, and the like. Upon contact with the high energy source, a number of relatively high energy ionic and radical species form within the gas are able to react with the polymer surface, changing the surface structure. These techniques allow for treatment of a very thin surface layer, such that the bulk properties of the polymer are not adversely affected. The nature of the gas, and the manner in which it is excited, can be used to control the level to which the surface is modified. Such methods are described in references such as "Reactions of Polyethylene Surfaces with the Downstream Products of an Air Plasma: Gas Phase and Surface Spectroscopic Studies", *Journal of Polymer Science: Part A: Polymer Chemistry,* Vol. 34, 2299–2310 (1996) by Kill, Hunter and Mcintyre, "Remote Nitrogen Plasma Treatment of Polymers: Polyethylene, Nylon 6,6, Poly(ethylene Vinyl Alcohol), and Poly(ethylene Terephthalate)", *Journal of Polymer Science: Part A: Polymer Chemistry,* Vol. 30, 279–286 (1992) by Foerch and Hunter, "E.s.c.a. studies of corona-discharge-treated polyethylene surfaces by use of gas-phase derivatization", *Polymer,* Vol. 26, 1162–1166, (1985) by Gerenser et al., and "ESCA Applied to Polymers. XXII. RF Glow Discharge Modification of Polymers in Pure Oxygen and Helium-Oxygen Mixtures", *Journal of Polymer Science: Polymer Chemistry Edition,* Vol. 17, 957–976 (1979) by Clark and Dilks.

A plasma is a collection of positively and negatively charged particles produced by exposing a gas to a high energy source under conditions such that molecules in the material are dissociated and ionized. Typically, a gas is used to form a plasma by subjecting it to a high energy electrical discharge, although other sources, e.g. shock waves, microwaves, lasers, etc. can also be used. The gas used to form the plasma is widely variable, and can include oxygen, nitrogen, argon, helium and ammonia. Typically, plasma treatment is conducted under vacuum using oxygen, nitrogen or argon as the gas. Plasma treatment is discussed in "Plasma Technology" *Kirk-Othmer Encyclopedia of Chemical Technology,* 3$^{rd}$ Edition, Supplement, pp. 599, 1984 and "ESCA Applied to Polymers, XVIII. RF Glow Discharge Modification of Polymers in Helium, Neon, Argon and Krypton", D. T. Clark, A. Dilks, *Journal of Polymer Science: Polymer Chemistry Edition,* Vol. 16, pg. 911 (1978).

Corona treatment consists of passing a gaseous flow through a high energy electric arc, which creates high energy radicals and ionic species. When this corona treated gas contacts the polymer surface it can lead to reactions at the surface which change the structure of the surface. Whereas a plasma is a separate form of material, made up of dissociated ions, the corona simply creates some high energy species that then move with the gas flow. The gas used, the corona equipment, the time of exposure, and other factors can be used to control the extent to which the surface is modified. In addition, the chemical structure of the polymer surface controls the reactions which can occur and determines the structure of the surface thus prepared. Typically, the gases used in this method include oxygen, nitrogen, argon and air.

Flame treatment involves imposing a flame on the surface of the polymer. The flame is a highly oxidizing environment involving a mixture of fuel and oxygen which creates a wide variety of excited state ionic and radical species. This strongly oxidizing environment can effect changes in the structure of the polymer surface. The nature of the flame, the fuel source, the duration of exposure, and the structure of the polymer are variables which contribute to the structure of the end product.

Ozone treatment involves exposing the hydrogenated aromatic polymer substrate to ozone. Ozone ($O_3$) can be generated by a several methods such as treatment of air or oxygen with a corona or plasma, and the UV irradiation of air. These methods create ozone by cleaving diatomic oxygen ($O_2$) into oxygen atoms, which then combine with diatomic oxygen. Ozone generated in close proximity to the polymer surface can react with that surface and result in chemical modification. Ozone generation and treatments are further discussed in the *Kirk-Othmer Encyclopedia of Chemical Technology,* 3rd edition, Volume 16, 1981 (John Wiley & Sons).

The excited gas phase techniques are typically applied to the amorphous saturated hydrocarbon thermoplastic substrate for a sufficient time such that the surface chemistry is modified and enhanced adhesion is obtained. The amount of time necessary is dependent upon the materials involved, the excited gas phase technique, the placement of the substrate, and the like.

The treated polymer substrates of the present invention have enhanced adhesion to other materials, such as metals and other polymers. Metals which are suitable for adhesion include any metal which is inert with the amorphous saturated hydrocarbon thermoplastic substrate such as rare earth transition metals, aluminum, copper, chromium, nickel, titanium, silver, gold and their alloys, gadolinium iron cobalt alloy, terbium iron titanium alloy, terbium iron cobalt titanium alloy, gadolinium terbium iron alloy, terbium iron cobalt alloy, terbium iron alloy, terbium iron cobalt alloy, gallium antimony alloy, indium antimony alloy, or quaternary alloys containing transition metals and rare earth elements. Preferably, the metal is aluminum. Multiple layers of metals can also be employed, such as a first layer of nickel and a second layer of copper. Other polymers may also be adhered to the surface of the amorphous saturated hydrocarbon thermoplastic substrate. Such polymers include any polymer which would have an affinity to the modified surface including thermoplastic and thermosetting polymers with an affinity to the modified surface such as polyesters, polycarbonates, polydimethylsiloxanes, polyamides (nylons), polyacrylates, polyurethanes, and mixtures thereof.

Other materials which may also be adhered to the surface of the treated polymer substrate include acrylic based lacquers such as Daicure™ Clear SD-211 and SD-217 available from Dainippon Ink and Chemicals, Inc., pigments, inks or dyes such as Irgaphorgreen CDR available from Ciba-Geigy, water based systems with low molecular weight polystyrene/acrylate polymers or maleic anhydride polymers, glues such as acrylate/epoxy glues, ultra-violet curable acrylic resins, and the like.

Methods of applying metals and other polymer materials to the polymer substrate include any conventional method known in the art for such materials such as coating, sputtering, vacuum deposition, solvent deposition, vacuum evaporation, and wet silvering.

In one embodiment of the present invention, an adhesion enhanced PCHE optical media disc is obtained. The disc is molded using any typical molding technique which are well known in the art and described in *The Compact Disc Handbook,* 2nd edition, by Pohlmann. The surface of the disc is then modified by treatment with argon plasma and is then coated with a reflective layer of aluminum by cathode sputtering. Optical discs are useful as optical high density information recording medium such as compact discs, video discs, DVD discs, CD-rewritable discs, memory discs for computers, optical magnetic discs or optical cards.

The following examples are provided to illustrate the present invention. The examples are not intended to limit the scope of the present invention and they should not be so interpreted. Amounts are in weight parts or weight percentages unless otherwise indicated.

EXAMPLES

Six compact discs are prepared by injection molded polycyclohexylethylene.

Disc 1 is a control which has not been surface treated wherein the disc substrate is characterized by X-ray photoelectron spectroscopy and contact angle analysis to determine surface composition and energy using the Zismann technique (water, formamide, ethylene glycol, and dimethylsulfoxide were used). This data is summarized in Table 1.

Disc 2 is a control which has not been surface treated, but is coated with a layer of aluminum using a vapor deposition process. The substrate to metal adhesion is determined via ASTM method D 3359. This data is shown in Table 2.

Disc 3 is treated using a Tegal 903e plasma etcher under the following conditions: argon atmosphere, 750 mTorr pressure, 100 W rf power, for approximately 2 minutes. Surface energy and XPS analysis are performed immediately after plasma treatment and are given in Table 1.

Disc 4 is treated with an argon plasma under conditions identical with that described above, and is metallized with Al. The adhesion of the metal to substrate was tested via ASTM D 3359, and the data is given in Table 2.

Disc 5 is treated using a Tegal 903e plasma etcher under the following conditions: nitrogen atmosphere, 750 mTorr pressure, 500 W rf power, for approximately 24 seconds.

Surface energy and XPS analysis are performed immediately after plasma treatment and this data is given in Table 1.

Disc 6 is treated with a nitrogen plasma under conditions identical with that described above, and is metallized with Al. The adhesion of the metal to substrate was tested via ASTM D 3359, and the data is given in Table 2.

| Treatment | Critical Surface Energy (dynes/cm) | Contact Angle, $H_2O$ | % Oxygen* | % Nitrogen* | % Carbon* |
|---|---|---|---|---|---|
| None** (Disc 1) | 22 | 98° | 0.3 | not detected | 99.7 |
| Ar plasma (Disc 3) | 44 | 75° | 5.6 | 4.1 | 89.4 |
| $N_2$ plasma (Disc 5) | 54 | 26° | 4.2 | 16.0 | 78.0 |

*From XPS analysis, given as atom percent. This analysis reflects composition at the first 10 nm of the substrate surface.
**Comparative example with no surface treatment.

Classification of adhesion test results:

Metallized CD discs are tested for metal/substrate adhesion by crosshatching the metal film and performing tape pull testing as per ASTM D 3359. The classifications of metal adhesion quality are described below.

| Classification | Description |
|---|---|
| 5B | The edges of the cuts are completely smooth; none of the squares of the lattice is detached. |
| 4B | Small flakes of the coating are detached at intersections; less than 5% of the area is affected. |
| 3B | Small flakes of the coating are detached along edges and at intersections of cuts. The area affected is 5 to 15% of the lattice. |
| 2B | The coating has flaked along the edges and on parts of the squares. The area affected is 15 to 35% of the lattice. |
| 1B | The coating has flaked along the edges of the cuts in large ribbons and whole squares have detached. The area affected is 35 to 65% of the lattice. |
| 0B | Flaking and detachment worse than Grade 1. |

Four tape pull tests were performed on each of the metallized disc forms.

TABLE 2

Adhesion of Aluminum to PCHE Substrate

| Treatment | Tape Pull Adhesion Results |
|---|---|
| control** (Disc 2) | 0B, 0B, 0B, 0B |
| Ar plasma (Disc 4) | 3B, 3B, 5B, 4B |
| $N_2$ plasma (Disc 6) | 5B, 4B, 0B, 4B |

**Comparative example with no surface treatment.
The surface treatment of the polymer substrate significantly increases the adhesion to metal.

What is claimed is:

1. An amorphous saturated hydrocarbon thermoplastic substrate which has been treated by an excited gas phase technique such that a critical surface energy of at least 35 dynes/cm is obtained.

2. The substrate of claim 1 wherein the thermoplastic is selected from the group consisting of polycyclohexylethylene homo- or copolymers, cyclic olefin polymers and ring-opening metathesis polymers.

3. The substrate of claim 1 wherein the thermoplastic is polycyclohexylethylene.

4. The substrate of claim 1 wherein the thermoplastic is a block copolymer of polycyclohexylethylene.

5. The substrate of claim 1 wherein the thermoplastic is a cyclic olefin polymer.

6. The substrate of claim 1 wherein the thermoplastic is a ring-opening metathesis polymer.

7. The substrate of claim 1 which additionally comprises a metal adhered to the substrate surface.

8. The substrate of claim 7 wherein the metal is selected from aluminum, chromium, nickel, titanium, silver, copper and gold.

9. The substrate of claim 8 wherein the metal is aluminum.

10. The substrate of claim 1 which additionally comprises a polymer adhered to the substrate surface.

11. The substrate of claim 10 wherein the polymer is selected from the group consisting of a polyester, polycarbonate, polydimethylsiloxane, polyamide, polyacrylate, polyurethane and mixtures thereof.

12. The substrate of claim 11 wherein the polymer is polycarbonate.

13. The substrate of claim 1 wherein the excited gas phase technique is a corona discharge treatment.

14. The substrate of claim 1 wherein the excited gas phase technique is a plasma treatment.

15. The substrate of claim 1 wherein the excited gas phase technique is flame treatment.

16. The substrate of claim 1 wherein the excited gas phase technique is ozone treatment.

17. The substrate of claim 1 wherein the excited gas phase technique is a plasma treatment in argon and the substrate further comprises a layer of aluminum adhered to the surface of the hydrogenated aromatic polymer substrate.

18. The substrate of claim 1 further comprising a metal layer adhered to the surface of the amorphous saturated hydrocarbon thermoplastic substrate, wherein the metal layer is also adhered to another polymer layer, forming a amorphous saturated hydrocarbon thermoplastic/metal/polymer laminate.

19. A CD-audio disc prepared from the substrate of claim 1.

20. A CD-ROM disc prepared from the substrate of claim 1.

21. A DVD disc prepared from the substrate of claim 1.

22. A CD rewritable disc prepared from the substrate of claim 1.

* * * * *